No. 850,332. PATENTED APR. 16, 1907.
R. J. F. & A. E. ALDRED.
DOUGH DIVIDING MACHINE.
APPLICATION FILED DEC. 29, 1906.

3 SHEETS—SHEET 1.

WITNESSES:

INVENTORS.
Robert J. F. and Alfred E. Aldred
BY
ATTORNEYS.

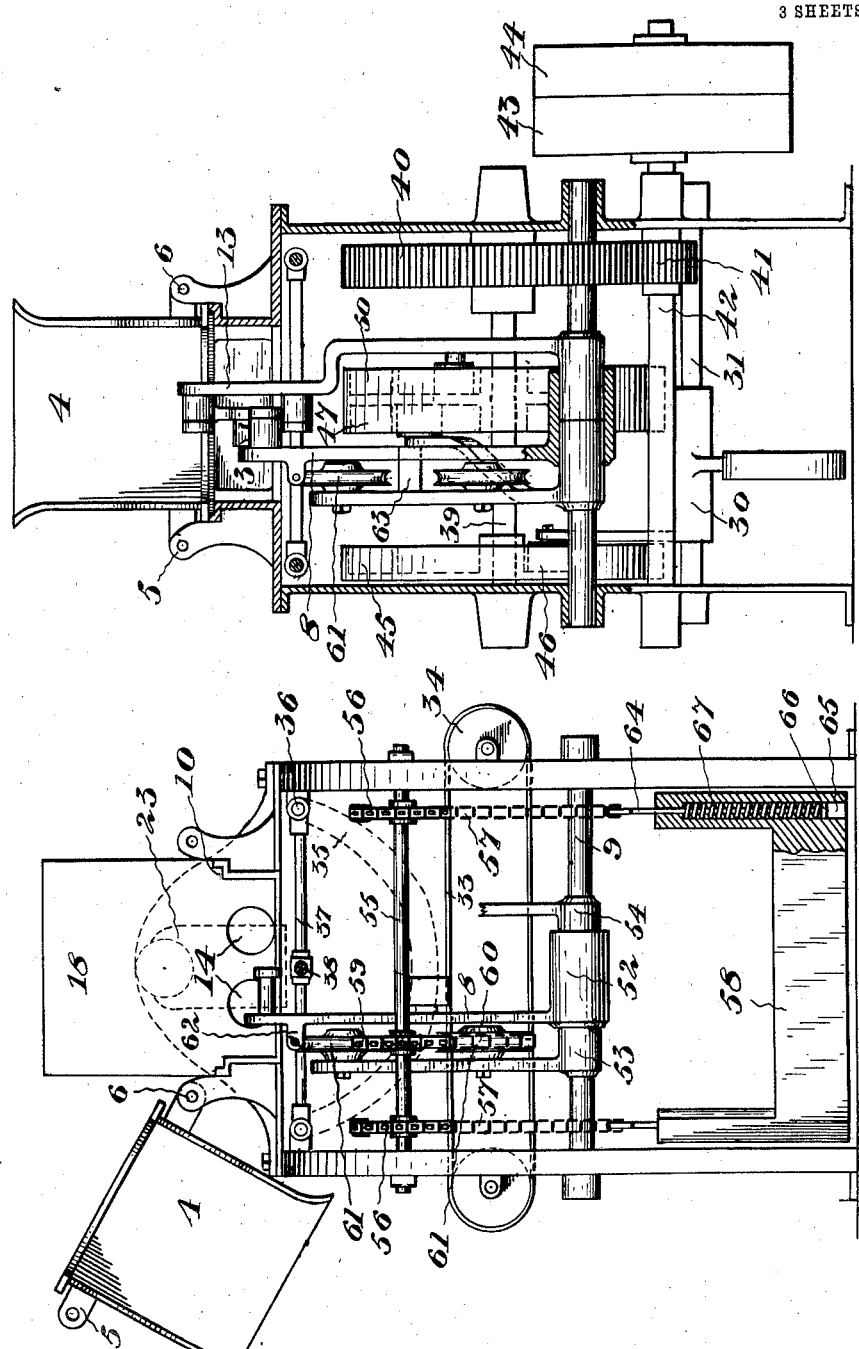

No. 850,332. PATENTED APR. 16, 1907.
R. J. F. & A. E. ALDRED.
DOUGH DIVIDING MACHINE.
APPLICATION FILED DEC. 29, 1906.

3 SHEETS—SHEET 3.

WITNESSES:
C. A. Bath
Edgar Mooseffail

INVENTOR.
Robert J. F. and Alfred E. Aldred
BY
Ridout & Maybee
ATTORNEYS.

UNITED STATES PATENT OFFICE.

ROBERT J. F. ALDRED AND ALFRED E. ALDRED, OF GLENCOE, ONTARIO, CANADA.

DOUGH-DIVIDING MACHINE.

No. 850,332.　　　　　Specification of Letters Patent.　　　　　Patented April 16, 1907.

Application filed December 29, 1906. Serial No. 349,975.

*To all whom it may concern:*

Be it known that we, ROBERT J. F. ALDRED and ALFRED E. ALDRED, of the town of Glencoe, in the Province of Ontario, Canada, have invented certain new and useful Improvements in Dough-Dividing Machines, of which the following is a specification.

This invention relates to machines in which dough is divided, compressed, measured off, and finally discharged onto a suitable conveyer; and our object is, first, to devise a machine which may be easily cleaned; second, to simplify the mechanism by providing means operating the dividing-knife and the discharge from one cam; third, to devise improved means for applying the compressing effect of a weight to the dough; fourth, to improve the construction of the adjustable stop regulating the quantity of dough measured; fifth, to provide means for easing the jar when the weight is lifted in the operation of compressing the dough.

With these objects in view our invention consists, essentially, of the constructions hereinafter more specifically described and then definitely claimed.

Figure 1:
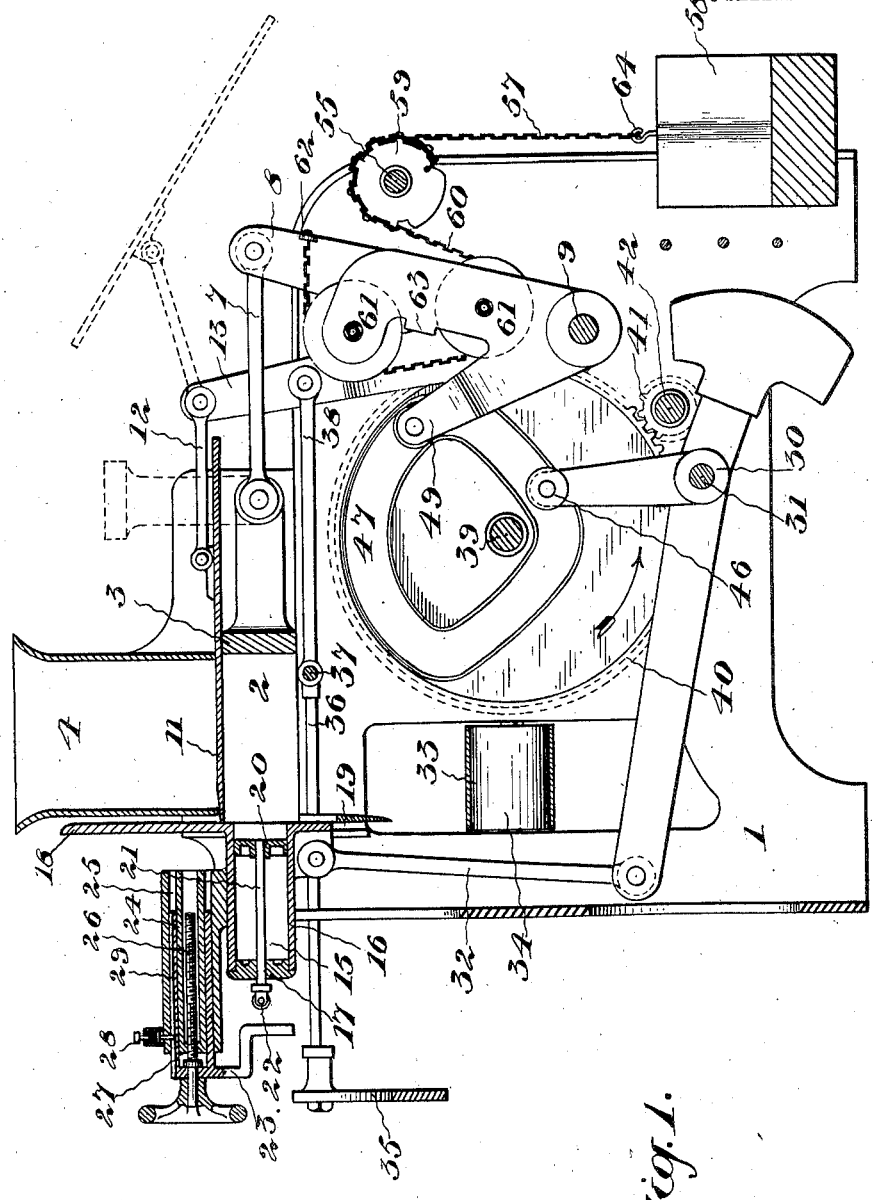
Figure 4:
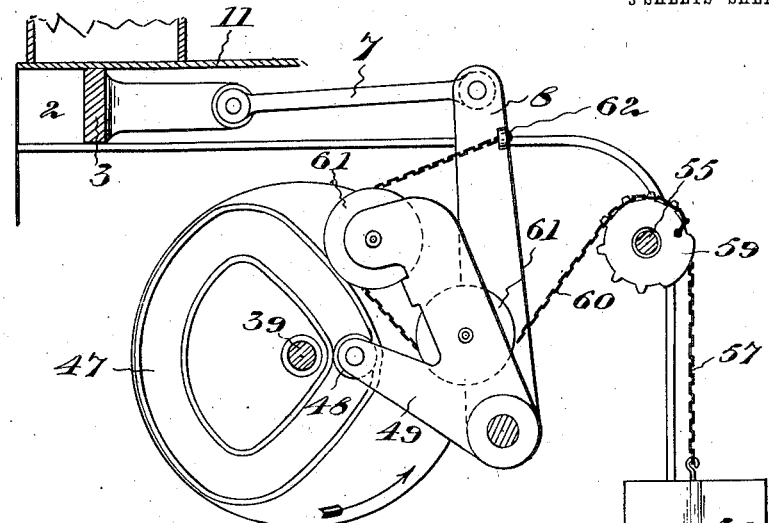
Figure 5:
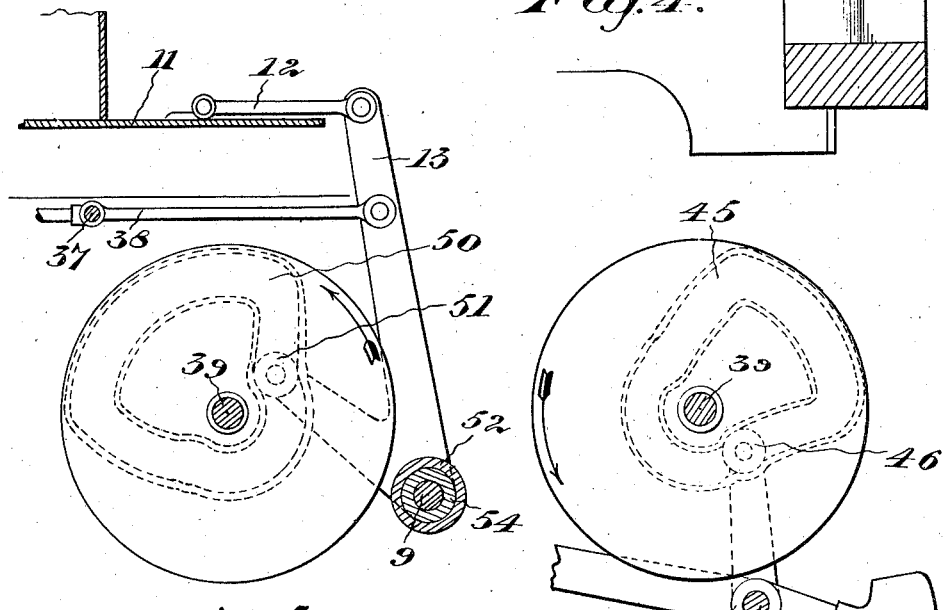
Figure 6:
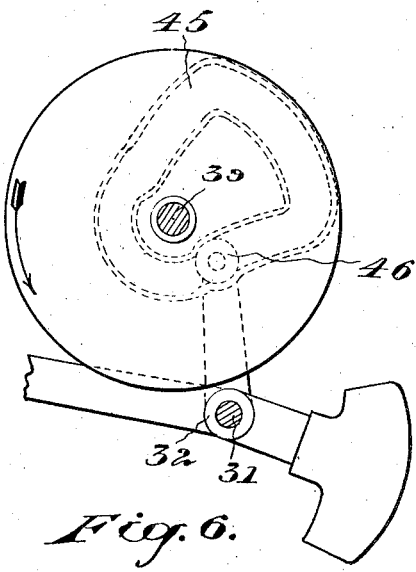

Figure 1 is a longitudinal sectional elevation of our improved machine. Fig. 2 is a similar view taken from the front of the machine. Fig. 3 is an end elevation looking in the same direction, with the hopper swung to one side and certain of the parts omitted to more clearly show the remainder. Fig. 4 is a detail in side elevation of the means for operating the plunger. Fig. 5 is a similar view showing the means for operating the discharger and the knife. Fig. 6 is a similar view showing part of a lever for moving the measuring-chamber and the cam for moving the lever.

In the drawings like letters of reference indicate corresponding parts in the different figures.

1 is the frame of the machine, suitably shaped to support the different parts. At the top of the machine is formed a plunger-chamber 2, within which the plunger 3 is longitudinally movable. This chamber is preferably open in front and is also open at the top, and above it is secured the removable hopper 4. This is secured in position by means of hinges 5 at each side, one half of each hinge being formed on the plunger-chamber and the other on the hopper. Each hinge-pin 6 is removable, so that by removing one pin the hopper may be hinged to one side, as shown in Fig. 3. By removing both pins the hopper may be completely removed, if desired. The plunger is pivotally connected with one end of the connecting-rod 7, the other end of which is pivotally connected with the lever-arm 8, fulcrumed on the shaft 9. As indicated in dotted lines in Fig. 1, the plunger may be thrown up out of the plunger-chamber in order that the latter may be cleaned out. This of course can only take place when the hopper has been removed, as shown in Fig. 3.

Between the hopper and the plunger-chamber are formed the guideways 10, in which the dividing-knife 11 is adapted to slide. This knife is pivotally connected with one end of the connecting-rod 12, the other end of which is pivotally connected with the lever-arm 13, of which the shaft 9 is the fulcrum.

Owing to the fact that the guideways for the knife are formed between the walls of the plunger-chamber and the walls of the hopper, when the hopper is removed, as shown in Fig. 2, the knife may be lifted out of the guideways and swung back, as shown in dotted lines in Fig. 1. This enables the knife and the interior of the apparatus to be readily got at for cleaning purposes, the ease with which the plunger also can be hinged up out of the chamber contributing materially to this result, as already described.

In the end of the plunger-chamber 2 opposite the plunger are formed one or more apertures 14, through which dough may be forced by the plunger into the measuring-chambers 15. Each chamber comprises a cylinder 16, provided with a head 17, held in position in any ordinary manner.

The measuring-chambers are connected to a slide 18, vertically movable in the guides 19, formed on the frame of the machine. The measuring-chambers may thus be brought into alinement with the plunger-chamber, as shown in Fig. 1, or moved down after they have been filled for the purpose of discharging their contents, as hereinafter described. For the purpose of discharging its contents at the proper time and also for the purpose of varying its capacity, each measuring-chamber is provided with a piston 20, provided with a pitson-rod 21, extending through the end of the cylinder and preferably provided with a friction-roller 22. It is evident that by adjusting the piston within the cylinder the capacity of the measuring-chamber may be adjusted at will.

It will be understood, of course, by those skilled in the art that dough is forced into the measuring-chamber by the action of the plunger, the piston moving outwardly under the pressure. This outward movement is limited by the vertical stop-plate 23. This stop-plate is secured to a cylindrical slide 24, which is fitted into a similarly-shaped guide 25, formed on the frame of the machine. An adjusting-screw 26 is revolubly carried by the slide and engages the nut 27, formed on the guide. Hence by revolving the adjusting-screw the stop-plate 23 may be adjusted to and from the measuring-chambers. For the purpose of holding the slide from rotation we provide the guide with a spring-actuated pin 28, the end of which is adapted to engage a longitudinal groove 29, formed in the slide. When it is desired to swing the stop out of the way, the pin may be lifted, when the slide may be easily turned in its guide.

As indicated in dotted lines in Fig. 3, the stop-plate is of sufficient width to serve for the adjustment of the capacity of both the measuring-chambers. The measuring-chambers are raised and lowered by means of a bell-crank lever 30, fulcrumed on the shaft 31. One arm of this lever is pivotally connected with the connecting-rod 32, the other end of which is pivotally connected with the slide 18. This bell-crank lever is operated in a manner to be hereinafter described.

The operation of the device so far as described is substantially as follows: Dough is fed into the hopper and thence into the plunger-chamber. The knife moves forward and divides the dough. The plunger subsequently moves forward and compresses the dough into the measuring chamber or chambers. Before the plunger retreats the measuring-chambers are moved downwardly. It will be noted that the slide 18, carrying the measuring-chambers, extends well above these latter, so that when the measuring-chambers have been moved away from the apertures 14 the slide 18 closes these latter. The measuring-chambers move down to a position just above the endless conveyer 33, which is carried on the pulleys 34 and driven in any suitable manner. When the measuring-chambers are in their lowered position, the pistons 20 are operated by the mechanism we will now describe to force the dough out onto the conveyer.

The discharger 35 comprises a curved bar secured to the rods 36, suitably guided in the frame of the machine, and these rods are connected by a cross-bar 37, pivotally connected with one end of the connecting-rod 38, the other end of which is pivotally connected with the lever-arm 13. The object in curving the discharger 35 downwardly is to bring it into alinement with the measuring-chambers in their lowered position, while enabling us to place the rods 36, which carry it, in a suitable position above the operating-gear of the apparatus. This operating-gear we will now describe.

39 is a cam-shaft suitably journaled in the frame of the machine. This shaft carries a gear-wheel 40, meshing with a pinion 41 on the driving-shaft 42, which is provided with the usual fast and loose pulleys 43 and 44. On this cam-shaft is fast a cam 45, which cam engages the roller 46 on the end of the shorter arm of the bell-crank lever 30. The cam 45 thus effects the vertical movements of the measuring-chambers through the connections already described. On the same shaft is secured a cam 47, which engages the roller 48 on one arm of the bell-crank lever 49.

Preferably formed integral with the cam 47 is a cam 50, which engages the roller 51 on the shorter arm of the lever 13, which is also shaped as a bell-crank lever. This lever 13, it will be noted, is adapted to operate the dividing-knife and the discharger.

The lever 8, operating the plunger, it will be noted, has its hub 52 journaled on the hubs 53 and 54 of the levers 49 and 13. (See Figs. 2 and 3.) This lever-arm 8, it will be seen, is thus loose and has no direct drive. It is, however, given a yielding connection with the lever 49 through the medium of a weight in the following manner. On the front of the machine is journaled a shaft 55. On this shaft are secured two pulleys or sprocket-wheels 56, to which are secured chains 57. The other ends of these chains are connected to the weight 58 in a manner to be hereinafter described. On the shaft 55 is also secured a pulley or sprocket-wheel 59, to which is secured a chain 60. This chain passes around the idlers 61 on the lever 49, and its other end is secured to the lever 8 at 62. A stop 63 is secured to the rear side of the lever 49, and it follows from the construction just described that the weight 58 will tend to maintain the lever 8 in contact with the stop. It is evident then that the rotation of the cam 47 will cause the levers 49 and 8 to be reciprocated as if they were one as long as the plunger is free to move forward. When a charge of dough is being compressed, a point is soon reached at which it will yield but little to the compressing effect of the plunger. At this point the lever 49 moves out of engagement with the lever 8 and the bight of the chain 60 slides over the idlers 61. The weight 58 now furnishes the sole pressure on the plunger, and no matter at what point the movement of the plunger may be arrested it will be found that the full effect of the weight is at once brought to bear in the compression of the dough and that this pressure will remain substantially constant until the reverse movement of the plunger commences.

It is of course necessary that the cams be so proportioned and timed that the movements of the various parts occur in proper sequence. The sequence is as follows: The dividing-knife is first moved to cut the dough. Simultaneously therewith the discharger is moved rearwardly. As soon as a charge of dough is cut off the plunger is operated to compress the dough. Before the pressure of the plunger is removed the measuring-chamber is moved downwardly to its discharged position and subsequently the discharger moved forward to force out the measured and compressed dough onto the conveyer. The connections of the chains 57 with the weight, hereinbefore referred to, is formed in the following manner: The end of the chain is preferably formed as a rod 64. Each rod is carried down through the weight into a recess 65, formed in the under side of the weight. A head 66 is formed on the lower end of each rod, and between this head and the upper end of the recess is placed a coil-spring 67. When the plunger is stopped by contact with the dough, the weight is lifted very rapidly, and the spring connections just described aid materially in reducing the jar on the machine, which would otherwise result.

It will be noted that the idlers 61 on the lever 49 are located one toward the end of the lever and the other quite close to the fulcrum. This arrangement is important, for as the chain leads direct from the sprocket-wheel 69, carried by the frame to the idler nearest the fulcrum of the lever when the two levers 49 and 8 move together, there is very little lift imparted to the weight, whereas when the lever 8 is stopped, as previously described, and the lever 49 moves away from it the idler 61, near the end of the lever 49, rapidly draws on the bight of the chain 60, and the full effect of the weight is utilized in compressing the dough.

What we claim as our invention is—

1. In a dough-dividing machine the combination of a plunger-chamber; a hopper removably secured thereon; a dividing-knife, guideways for the knife being formed between the walls of the chamber and the hopper; and a plunger in said chamber, the chamber being shaped to permit of the removal of the plunger through the hopper side of the chamber when the hopper has been removed, substantially as described.

2. In a dough-dividing machine the combination of a plunger-chamber; a hopper removably secured thereon; and a plunger in said chamber, the chamber being shaped to permit of the removal of the plunger through the hopper side of the chamber when the hopper has been removed, substantially as described.

3. In a dough-dividing machine the combination of a plunger-chamber; a hopper removably secured thereon; a dividing-knife, guideways for the knife being formed between the walls of the chamber and the hopper; a suitably-fulcrumed lever; and a connecting-rod having a pivoted connection with the lever and the plunger whereby the knife may be swung out of its guideways after removal of the hopper, substantially as described.

4. In a dough-dividing machine the combination of a plunger-chamber; a hopper removably secured thereon; a plunger in said chamber, the chamber being shaped to permit of the removal of the plunger through the hopper side of the chamber when the hopper has been removed; a suitably-fulcrumed lever; and a connecting-rod having a pivoted connection with the lever and the plunger whereby the plunger may be swung out of the chamber when the hopper has been removed, substantially as described.

5. In a dough-dividing machine the combination of a reciprocating dividing-knife; a reciprocating discharger; a suitably-fulcrumed bell-crank lever; a revoluble cam with which one arm of the bell-crank lever is adapted to engage; and two connecting-rods pivotally connected to the other arm of the bell-crank lever, and to the knife and discharger respectively, substantially as described.

6. In a dough-dividing machine the combination of a hopper; a plunger-chamber below the same; a knife adapted to reciprocate between the two; a plunger adapted to reciprocate in said chamber; means for moving the same; a measuring-chamber adapted to be moved transversely of the plunger-chamber; means for moving the measuring-chamber into and out of alinement with the plunger-chamber; a piston movable in said measuring-chamber; a piston-rod secured to said piston; a reciprocating discharger adapted to engage the piston-rod when the measuring-chamber has been moved out of alinement with the plunger-chamber; and means for simultaneously operating the knife and discharger, substantially as described.

7. In a dough-dividing machine the combination of a hopper; a plunger-chamber below the same; a knife adapted to reciprocate between the two; a plunger adapted to reciprocate in said chamber; means for moving the same; a measuring-chamber adapted to be moved transversely of the plunger-chamber; means for moving the measuring-chamber into and out of alinement with the plunger-chamber; a piston movable in said measuring-chamber; a piston-rod secured to said piston; a reciprocating discharger adapted to engage the piston-rod when the measuring chamber has been moved out of alinement with the plunger-chamber; a suitably-fulcrumed lever; means for rocking the same; and two connecting-rods pivotally connected to the lever and to the knife and discharger respectively, substantially as described.

8. In a dough-dividing machine the combination of a plunger-chamber; a plunger movable therein; a suitably-fulcrumed lever; a link pivoted on the plunger and lever; a second lever suitably fulcrumed; mechanism adapted to rock said lever; a weight; a chain connection between the weight and the first lever; and idlers on the second lever and the frame round which the chain is carried so that by the rocking of the second lever the first lever is caused to raise and lower the weight and move the plunger, substantially as described.

9. In a dough-dividing machine the combination of a plunger-chamber; a plunger movable therein; a suitably-fulcrumed lever; a link pivoted on the plunger and lever; a second lever suitably fulcrumed; mechanism adapted to rock said lever; a weight; a chain connection between the weight and the first lever; idlers on the second lever and the frame round which the chain is carried so that by the rocking of the second lever the first lever is caused to raise and lower the weight and move the plunger; and a stop limiting the forward movement of the first lever relative to the second, substantially as described.

10. In a dough-dividing machine the combination of a plunger-chamber; a plunger movable therein; a suitably-fulcrumed lever; a driving connection between the lever and the plunger; a second lever suitably fulcrumed; mechanism adapted to rock said lever; a weight; a chain connection between the weight and the first lever; and idlers on the second lever and the frame round which the chain is carried so that by the rocking of the second lever the first lever is caused to raise and lower the weight and move the plunger, substantially as described.

11. In a dough-dividing machine the combination of a plunger-chamber; a plunger movable therein; a suitably-fulcrumed lever; a driving connection between the lever and the plunger; a second lever suitably fulcrumed; mechanism adapted to rock said lever; a weight; a chain connection between the weight and the first lever; idlers on the second lever and the frame round which the chain is carried so that by the rocking of the second lever the first lever is caused to raise and lower the weight and move the plunger; and a stop limiting the forward movement of the first lever relative to the second, substantially as described.

12. In a dough-dividing machine the combination of a measuring-chamber; a piston movable therein; a piston-rod connected thereto; a stop with which the end of the piston-rod may engage; a cylindrical slide to which said stop is connected, having a longitudinal groove in its surface; a stationary cylindrical guide in which said slide is movable; means for adjusting said slide lengthwise in the guide; and a radially-movable pin adapted to engage said slot, substantially as described.

13. In a dough-dividing machine a plunger; a weight having a cylindrical recess formed in its under side; a chain passing down through said recess; a coil-spring engaged with the lower end of the chain and the upper end of the recess; and means for drawing on the chain to raise the weight and to bring its gravity to bear on the plunger, substantially as described.

14. In a dough-dividing machine the combination of a plunger-chamber; a plunger movable therein; a suitably-fulcrumed lever; a link pivoted on the plunger and lever; a second lever suitably fulcrumed; mechanism adapted to rock said lever; a weight; a chain connection between the weight and the first lever; an idler on the second lever adjacent to the fulcrum; an idler on the said lever near its end, and an idler on the frame, the chain running from the idler on the frame around the idler adjacent to the fulcrum of the lever, and thence around the other idler on the lever to its point of connection with the first lever, substantially as described.

15. In a dough-dividing machine the combination of a plunger-chamber; a plunger movable therein; a suitably-fulcrumed lever; a driving connction between the lever and the plunger; a second lever suitably fulcrumed; mechanism adapted to rock said lever; a weight; a chain connection between the weight and the first lever; an idler on the second lever adjacent to the fulcrum; an idler on the said lever near its end, and an idler on the frame, the chain running from the idler on the frame around the idler adjacent to the fulcrum of the lever, and thence around the other idler on the lever to its point of connection with the first lever, substantially as described.

16. In a dough-dividing machine the combination of a plunger-chamber; a plunger movable therein; a suitably-fulcrumed lever; a link pivoted on the plunger and lever; a second lever suitably fulcrumed; mechanism adapted to rock said lever; a weight; a chain connection between the weight and the first lever; an idler on the second lever adjacent to the fulcrum; an idler on the said lever near its end; an idler on the frame, the chain running from the idler on the frame around the idler adjacent to the fulcrum of the lever, and thence around the other idler on the lever to its point of connection with the first lever; and a stop limiting the forward movement of the first lever relative to the second, substantially as described.

17. In a dough-dividing machine the combination of a plunger-chamber; a plunger movable therein; a suitably-fulcrumed lever; a driving connection between the lever and the plunger; a second lever suitably fulcrumed; mechanism adapted to rock said lever; a weight; a chain connection between the weight and the first lever; an idler on the second lever adjacent to the fulcrum; an idler on the said lever near its end; an idler on the frame, the chain running from the idler on the frame around the idler adjacent to the fulcrum of the lever, and thence around the other idler on the lever to its point of connection with the first lever; and a stop limiting the forward movement of the first lever relative to the second, substantially as described.

Glencoe, Ontario, December 24, 1906.

ROBERT J. F. ALDRED.
ALFRED E. ALDRED.

In presence of—
WILLIAM D. MOSS,
ALFRED SMART.